United States Patent [19]

Heller

[11] 3,922,174
[45] Nov. 25, 1975

[54] ELECTROCHEMICAL CELL

[75] Inventor: Adam Heller, Sharon, Mass.

[73] Assignee: GTE Laboratories Incorporated, Waltham, Mass.

[22] Filed: Jan. 22, 1973

[21] Appl. No.: 325,467

[52] U.S. Cl......... 136/6 LN; 136/83 R; 136/100 R; 136/137; 136/166; 136/121
[51] Int. Cl..................... H01m 35/00; H01m 43/06
[58] Field of Search ......... 136/6 R, 6 LN, 20, 83 R, 136/100 R, 154–155, 137, 121, 166, 131, 132, 181, 7, 79, 80, 107–111, 121, 122; 206/2

[56] References Cited
UNITED STATES PATENTS

| | | | |
|---|---|---|---|
| 3,248,265 | 4/1966 | Herbert | 136/100 R X |
| 3,415,687 | 12/1968 | Methlie | 136/100 R |
| 3,423,242 | 1/1969 | Meyers et al. | 136/100 R |
| 3,514,337 | 5/1970 | Braeuer et al. | 136/100 R |
| 3,567,515 | 3/1971 | Maricle et al. | 136/6 LN |
| 3,615,831 | 10/1971 | Ruben | 136/26 |
| 3,700,502 | 10/1972 | Watanabe et al. | 136/100 R X |

*Primary Examiner*—Anthony Skapars
*Attorney, Agent, or Firm*—Irving M. Kriegsman

[57] ABSTRACT

An electrochemical cell having an alkali metal anode; a cathode on which the solvent material is catalytically reduced, said cathode comprising a catalytic cathode material selected from the group consisting of gold, carbon and $(C_4F)_n$; and an electrolyte containing an inorganic solvent selected from the group consisting of phosphorus oxychloride, thionyl chloride, sulfuryl chloride, and mixtures thereof, and a solute dissolved in the solvent. Such cells are housed in a titanium or titanium alloy case which has been found to be compatible with the highly reactive liquid inorganic oxyhalide solvent material.

19 Claims, No Drawings

ELECTROCHEMICAL CELL

BACKGROUND OF THE INVENTION

This invention relates to electrochemical cells. Most particularly, it relates to electrochemical cells having an alkali metal anode, a cathode material capable of catalytically decomposing the solvent material, an electrolyte including as the solvent material at least one oxyhalide of phosphorus or sulfur and a solute material dissolved in the electrolyte solvent, all of these components being housed in titanium or titanium alloy case.

Modern technology has placed increased emphasis on producing an electrochemical power source having improved reliability, light weight, high power and long life. Power sources meeting these requirements find ready civilian and military applications in communications, entertainment products, portable light sources and weapon systems.

Various high-voltage, high-energy density electrochemical cells have been the subject of recent investigation. Much of the work in this area has been involved with electrochemical cells having negative electrodes comprising highly reactive metals such as lithium.

Work on electrolytes for lithium-based electrochemical power sources has progressed generally along two major lines: high temperature molten salt electrolytes and organic solvent electrolytes. A cell which utilizes a molten salt electrolyte provides a chemically stable system in which strong oxidants such as chlorine can be used as cathodes. A cell utilizing a lithium anode and chlorine cathode provides exceptionally high energy and power density making development of a practical cell with these materials of particular interest. The molten salt lithium/chlorine cell (having a lithium anode, chlorine cathode and molten salt, typically lithium chloride, electrolyte) has many characteristics desirable in a high performance electrochemical cell. The anode is highly electropositive, and the cathode is highly electronegative. The equivalent weight of the reaction product is low and the anode, cathode and electrolyte conductivities are high. Nevertheless, these cells have severe problems. The temperature range of operation, which for the lithium chloride electrolyte is 450° to 650°C, necessitates heating systems and insulation that increase its cost, weight and complexity; auxiliary systems are needed to collect and store the chlorine evolved in rechargeable cells at these high temperatures; and there are few materials that can withstand for extended periods the attack of molten lithium, chlorine, and molten lithium chloride at these temperatures.

In parallel with the development of lithium cells with molten salt electrolytes, lithium cells with nonhydroxylic organic solvents have been developed. These cells have been called "organic electrolyte cells" although typically they employ electrolytes consisting of inorganic salts in organic solvents. Cells of this type have the advantage of being operable at room temperature; however, chlorine itself and other strong oxidants cannot be used as a cathode with these solvents since the solvents are oxidized. Therefore, cells of this type will not provide an energy density as high as a lithium chlorine cell.

In application Ser. No. 131,530 filed Apr. 5, 1971, now abandoned and assigned to the assignee of the present invention, there is described an electrochemical cell having an anode selected from a specific group of materials, including lithium, a cathode selected from a wide range of materials, and an electrolyte including an inorganic solvent, specifically phosphorus oxychloride, and a solute, selected from a wide range of materials, dissolved in the solvent.

In application Ser. No. 305,811 filed Nov. 13, 1972, there are described electrochemical cells wherein the phosphorus oxychloride solvent is admixed with a low freezing solvent material to extend the operating range of the phosphorus oxychloride cell to temperatures well below about 0°C.

In application Ser. No. 305,812 filed Nov. 13, 1972, now abandoned, there are described further electrochemical cells having thionyl chloride, sulfuryl chloride, and mixtures thereof as the solvent material.

In applications Ser. Nos. 305,813 and 305,796, both filed Nov. 13, 1972, both now abandoned, there is disclosed, respectively, the use of carbon and $(C_4F)_n$ active cathode materials as surfaces upon which the solvent material is catalytically reduced, thereby yielding cells utilizing the otherwise "dead" weight of the solvent material as an energy source.

The present invention is related to the inventions described in the aforementioned applications in that the same anodic, cathodic solvent and solute materials can be utilized in the present invention; however, this invention relates to the housing of such components in a titanium or titanium alloy case or can which has been found to be compatible with the highly reactive inorganic solvents described above in the aforementioned copending applications. Additionally, the aforementioned active cathode materials may be supported on titanium or a titanium alloy which functions as the noncatalytic current collector of the cathode.

SUMMARY OF THE INVENTION

This invention is directed to an electrochemical cell having an alkali metal anode; a catalytic cathode upon which the solvent material is reduced, said cathode including a catalytic active cathode material selected from the group consisting of gold, carbon and $(C_4F)_n$; and an electrolyte having an inorganic solvent material selected from the group consisting of phosphorus oxychloride, thionyl chloride, sulfuryl chloride, and mixtures thereof, and a solute selected from a wide range of materials dissolved in the solvent. The cell is housed in a container made of titanium or a titanium alloy. Such a container has been found not only to be lightweight, but to be compatible with the highly reactive inorganic solvents described above.

The anode is an active material and is preferably lithium metal. Another material for anodes contemplated for use in this invention is sodium. The anode may be constructed of the active anode material in contact with a metal grid. Preferably, the grid for the active anode material is made of titanium or a titanium alloy, nickel or a nickel alloy.

The active cathode material is a material which is capable of catalytically reducing the solvent material during operation of the cell. Such materials include, for example, gold, carbon, and $(C_4F)_n$. $(C_4F)_n$ is a carbon-fluorine intercalation compound where n refers to the presence of a large, but indefinite, number of recurring $(C_4F)$ groups in the intercalation compound, such as shown, for example, in U.S. Pat. No. 3,514,337. It is commercially available under the designation fluorographite-B from Ozark-Mahoning Co.

The $(C_4F)_n$ active cathode material can be utilized in combination with graphite, carbon black, or $(CF)_n$. When admixed with $(CF)_n$ the active cathode material will have an average or representative formula $(C_xF)_n$, where $x$ is greater than 1 and less than 4. Such an intercalation compound is considered to be a mixture of $(C_4F)_n$ and $(CF)_n$ in a proportion which gives the particular value of $x$.

The carbon cathode can be in any of its conventional electrode acceptable forms, for example, graphite, carbon black or acetylene black, etc. Graphite and carbon black are, however, presently preferred.

If desired, the active cathode material may be blended with a binder material, such as polyethylene, polypropylene, polytetrafluoroethylene, etc.

The active cathode material, with or without binder, may be either unsupported or supported by a current collector which is inert to the particular solvent materials utilized in the cells of this invention. By "inert" it is meant that there is no physical, chemical or electrochemical interaction with the solvent material. Suitable current collectors include titanium or titanium alloys having a minor percentage, on the order of about 0.1 to about 10 percent, by weight, of nickel, aluminum, vanadium, etc. Optionally, the active cathode material may instead be blended with a finely divided conductive material, if necessary, to make the mixture sufficiently conductive.

As indicated above, the cathode material will catalyze the electrochemical decomposition of the solvent; stated differently, it will allow the use of the solvent as the oxidizing cathode component. This enables the otherwise dead weight of the electrolyte solvent to be utilized as an energy source.

As used throughout this specification and claims, when an electrochemical cell is designated to have a particular anode or cathode, or to be made of a particular anode or cathode material, that anode or cathode, or anode or cathode material, shall mean the electrochemically active component of the anode or cathode structure. The electrochemically active component may be in contact with or form a part of a suitable substrate which further defines the total anode or cathode structure.

The electrolyte comprises an inorganic solvent material selected from the group consisting of phosphorus oxychloride, thionyl chloride, sulfuryl chloride, and mixtures thereof. It is preferred that the solvent be dried prior to use. In the case of phosphorus oxychloride, for example, this can be accomplished by boiling this solvent with clean lithium shot for twelve hours at room temperature under an argon atmosphere. The solvent is then distilled at atmospheric pressure and the material which boils between 105°C and 106°C is collected. Other suitable techniques, and drying techniques for the other solvent, are described in the published literature or will be apparent to those skilled in the art.

In general, the solvents utilized in the cells of the present invention are thermodynamically stable relative to their constituent elements, differing in this respect from known organic solvents previously utilized in electrochemical cells. Because of this stability, the solvents do not irreversibly decompose when the cells are charged at substantial overpotentials. In phosphorus oxychloride, for example, charging overpotentials result in the formation of trivalent phosphorus compounds and dissolved chlorine. These recombine to give the solvent, thus opening the way to readily rechargeable lithium cells which operate at ambient temperatures and atmospheric pressure.

Solutes which can be dissolved in the solvent material provide at least one anion of the general formula, $MX_4^-$, $M'X_6^-$, and $M''Cl_6^{--}$, where M is an element selected from the group consisting of aluminum and boron; M' is an element selected from the group consisting of phosphorus, arsenic, and antimony; M'' is an element selected from the group consisting of tin, zirconium, and titanium; and X is a halogen. Examples of suitable solutes yielding anions $MX_4^-$ are: tetrachloroaluminates ($AlCl_4^-$), tetrabromoaluminates ($AlBr_4^-$), tetrachloroborates ($BCl_4^-$), and tetrafluoroborates ($BF_4^-$). Examples of solutes yielding anions $M'X_6^-$ are hexafluorophosphates ($PF_6^-$). Examples of solutes yielding anions $M''Cl_6^{--}$ are: hexachlorostannates ($SnCl_6^{--}$), hexachlorozirconates ($ZrCl_6^{--}$) and hexachlorotitanates ($TiCl_6^{--}$). However solutes yielding a halogen anion, particularly chlorides ($Cl^-$), bromides ($Br^-$), and iodides ($I^-$), and solutes providing one of the anions dichloroiodates ($ICl_2^-$), dichlorophosphates ($PO_2Cl_2^-$), bound adducts of dichlorophosphates and Lewis acids (such as $ZrCl_4$, $AlCl_3$, $BCl_3$, etc.), and chlorosulfates ($SO_3Cl^-$) are also contemplated within the scope of this invention.

The solute also provides at least one cation. This cation may be an alkali metal, usually lithium or sodium. Another cation contemplated within the scope of this invention is phosphorus oxydichloride ($POCl_2^+$). The solute for a particular cell can be chosen to yield a combination of any of the anions and cations listed above, however, the electrolyte must contain at least $10^{-3}$ moles per liter of cation and at least $10^{-3}$ moles per liter of anion. Preferably, at least $10^{-1}$ moles per liter of cation and at least $10^{-1}$ moles per liter of anion are present. Solutes having lithium cations and large anions which are stable to oxidation and reduction are particularly desirable. The preferred lithium solute compounds are: lithium tetrachloroaluminate, lithium tetrachloroborate, lithium tetrafluoroborate, lithium hexafluorophosphate, lithium hexachlorostamate, lithium hexachlorozirconate, lithium hexachlorotitanate and lithium chlorosulfate. Other preferred compounds are Lewis acids; particularly aluminum chloride ($AlCl_3$), tin chloride ($SnCl_4$), antimony fluoride ($SbF_5$), titanium chloride ($TiCl_4$), aluminum bromide ($AlBr_3$), phosphorus fluoride ($PF_5$), and zirconium chloride ($ZrCl_4$). In addition, Lewis bases having the general formula AB where A is an element selected from the group consisting of lithium, sodium, potassium, rubidium and cesium, and B is an element selected from chlorine, bromine, iodine and oxygen are also useful.

The required anion and cation may be formed as a result of a chemical reaction directly with the solvent. For example, the Lewis acid $AlCl_3$ will react with the solvent $POCl_3$ to yield the anion $AlCl_4^-$. The anion and cation may also be formed as a result of the reaction of a Lewis acid with a Lewis base dissolved in the solvent.

Although not required for the cell of this invention, a suitable separator can be employed to prevent the reaction of anode and cathode materials when no electric current flows through the external circuit. A separator prevents the diffusion of cathode material to the anode. Since the cathode material is not soluble in the electrolyte, mechanical separators can be used. A wide variety of ceramic and plastic materials having small pore sizes are available. Examples of such materials include: alumina, beryllia, magnesia, zirconia, titania, porcelain, porous glass, fritted glass, nonwoven porous polytetrafluoroethylene and other fluorinated polymers.

The active elements of the cells of the present invention are housed in a titanium or titanium alloy container which is inert to the electrolyte solvent materials listed above. As set forth above with respect to the cathode current collector, "inert" is intended to mean the absence of, or a greatly reduced extent of, physical, chemical or electrochemical interaction with the solvent material. Since the material is inert, and specifically because it is inert electrochemically, the material can be utilized for the container, thereby reducing the overall weight of the cell while simultaneously increasing the overall energy density thereof (including the case or container material). The fact that titanium and its alloys, as listed above, are compatible with the phosphorus oxychloride, thionyl chloride and sulfuryl chloride solvents utilized in this invention is particularly surprising in view of the corrosion of most transition and structural metals including iron, lead, copper and aluminum when in contact with the solvent materials or electrolytic solution. Nonetheless, the titanium or titanium alloy cases of this invention lead to higher tolerances for internal pressure, impact, temperature, acceleration, etc., by the cell or battery than can be achieved by other cases (e.g.: of iron or nickel) of equal weight. Additionally, for equal performance, the container walls can be thinner thus further reducing the weight of the cell or battery, and with less corrosion due to increased resistance to the solvent materials, the cells will have a longer shelf life.

DESCRIPTION OF SPECIFIC EMBODIMENTS

The following Examples are given to enable those skilled in the art to more clearly understand and practice the present invention. They should not be considered as a limitation of the scope of the invention but merely as being illustrative and representative thereof.

EXAMPLE I

A cell is prepared having the following configuration:

| | |
|---|---|
| Anode: | Lithium |
| Cathode: | A blend of 63% carbon black and 37% polytetrafluoroethylene |
| Electrolyte: | 1.8 M LiAlCl$_4$ in SOCl$_2$ |
| Case: | Titanium |

EXAMPLE II

A cell is prepared having the following configuration:

| | |
|---|---|
| Anode: | Lithium |
| Cathode: | A blend of 63% carbon black and 37% polytetrafluoroethylene |
| Electrolyte: | 1.0 M LiAlCl$_4$ in SO$_2$Cl$_2$ |
| Case: | Titanium |

EXAMPLE III

A cell is prepared having the following configuration:

| | |
|---|---|
| Anode: | Lithium |
| Cathode: | Pyrolytic graphite |
| Electrolyte: | Saturated solution of LiBF$_4$ in POCl$_3$ |
| Case: | Titanium |

EXAMPLE IV

A cell is prepared having the following configuration:

| | |
|---|---|
| Anode: | Lithium |
| Cathode: | (C$_4$F)$_n$ blended with a polytetrafluoroethylene emulsion |
| Electrolyte: | 1.8 M LiAlCl$_4$ in SOCl$_2$ |
| Case: | Titanium |

EXAMPLE V

A cell is prepared having the following configuration:

| | |
|---|---|
| Anode: | Lithium |
| Cathode: | (C$_4$F)$_n$ blended with polytetrafluoroethylene as a binder |
| Electrolyte: | 1.0 M LiBCl$_4$ in POCl$_3$ |
| Case: | Titanium |

EXAMPLE VI

A cell is prepared having the following configuration:

| | |
|---|---|
| Anode: | Lithium |
| Cathode: | (C$_4$F)$_n$ blended with polytetrafluoroethylene as a binder |
| Electrolyte: | 1.0 M BCl$_3$ and 0.8 M LiCl in a (1:1) mixture of POCl$_3$ and SOCl$_2$ |
| Case: | Titanium |

EXAMPLE VII

A cell is prepared having the following configuration:

| | |
|---|---|
| Anode: | Lithium |
| Cathode: | 80% of a blend of (C$_4$F)$_n$ and (CF)$_n$ to give an active material of (C$_2$F)$_n$, 10% carbon black and 10% polytetrafluoroethylene emulsion as a binder |
| Electrolyte: | 1.8 M LiAlCl$_4$ in SOCl$_2$ |
| Case: | Titanium |

EXAMPLE VIII

A cell is prepared having the following configuration:

| | |
|---|---|
| Anode: | Lithium |
| Cathode: | (C$_4$F)$_n$ blended with polytetrafluoroethylene as a binder |
| Electrolyte: | 1.0 M LiAlCl$_4$ in a (1:1) mixture of SOCl$_2$ and SO$_2$Cl$_2$ |
| Case: | Titanium |

EXAMPLE IX

A cell is prepared having the following configuration:

| | |
|---|---|
| Anode: | Lithium |
| Cathode: | A blend of carbon black and polytetrafluoroethylene as a binder |
| Electrolyte: | 1.0 M LiAlCl$_4$ in a (1:1) mixture |

-continued

Case: of POCl₃ and SO₂Cl₂
Titanium

EXAMPLE X

A cell is prepared having the following configuration:

| | |
|---|---|
| Anode: | Sodium |
| Cathode: | A blend of carbon black and polytetrafluoroethylene as a binder |
| Electrolyte: | 1.0 M LiAlCl₄ in SOCl₂ |
| Case: | Titanium |

EXAMPLE XI

A cell is prepared having the following configuration:

| | |
|---|---|
| Anode: | Lithium |
| Cathode: | Gold plated over titanium current collector |
| Electrolyte: | 1.0 M LiAlCl₄ in SOCl₂ |
| Case: | Titanium |

EXAMPLE XII

Example XI is repeated except the electrolyte is 1.0 M LiBCL₄ in POCL₃, and the case is an alloy of 94½% titanium, 3% aluminum, and 2½% vanadium.

EXAMPLE XIII

Example I is repeated except the case is a 90% titanium—10% nickel alloy.

While the present invention has been described with reference to specific embodiments thereof, it will be understood by those skilled in this art that various changes may be made without departing from the true spirit and scope of the invention. In addition, many modifications may be made to adapt the particular situation, material, need, apparatus, process, or then-present objectives, to the spirit of the present invention without departing from its essential teachings.

What is claimed is:

1. An electrochemical cell comprising an alkali metal anode; a cathode material selected from the group consisting of gold, carbon and an intercalation compound represented by the formula $(C_4F)_n$ where $n$ refers to a large, but indefinite, number of recurring $(C_4F)$ groups in said intercalation compound; an electrolyte comprising an inorganic solvent selected from the group consisting of phosphorus oxychloride, thionyl chloride, sulfuryl chloride, and mixtures thereof, and a solute dissolved in said solvent; said anode, cathode and electrolyte being housed in a casing fabricated from titanium or a titanium alloy; said cathode material catalytically decomposing said solvent during cell operation whereby said solvent is utilized as the oxidizing cathode component.

2. The electrochemical cell of claim 1 wherein said housing is fabricated from titanium.

3. The electrochemical cell of claim 1 wherein said housing is fabricated from a titanium alloy.

4. The electrochemical cell of claim 1 wherein said housing is fabricated from a titanium alloy containing at least 90% titanium.

5. The electrochemical cell of claim 1 wherein said active anode material is lithium.

6. The electrochemical cell of claim 1 wherein said active anode material is sodium.

7. The electrochemical cell of claim 1 wherein said cathode material is gold.

8. The electrochemical cell of claim 1 wherein said cathode material is gold plated on a titanium or titanium alloy support.

9. The electrochemical cell of claim 1 wherein said cathode material is carbon black.

10. The electrochemical cell of claim 1 wherein said cathode material is graphite.

11. The electrochemical cell of claim 1 wherein said cathode material is $(C_4F)_n$, where $n$ is as defined in claim 1.

12. The electrochemical cell of claim 1 wherein said cathode material is a mixture of $(C_4F)_n$ and $(CF)_n$ to give a general formula $(C_xF)_n$ where $x$ is a numerical value greater than 1 and less than 4.

13. The electrochemical cell of claim 1 wherein said solute provides at least one anion having the formula $X^-$, $MX_4^-$, $M'X_6^-$, and $M''Cl_6^{--}$, where M is an element selected from the group consisting of aluminum and boron; M' is an element selected from the group consisting of phosphorus, arsenic and antimony; M'' is an element selected from the group consisting of tin, zirconium and titanium; and X is a halogen; said solute further providing at least one alkali metal cation.

14. The electrochemical cell of claim 1 wherein said solute includes at least one compound selected from the group consisting of lithium tetrachloroaluminate, lithium tetrachloroborate, lithium tetrafluoroborate, lithium hexafluorophosphate, lithium hexachlorostannate, lithium hexachlorozirconate, lithium hexachlorotitanate, lithium chlorosulfate, lithium chloride, lithium dichlorophosphate, and lithium tetrabromoaluminate.

15. The electrochemical cell of claim 1 wherein said solute comprises a Lewis acid.

16. The electrochemical cell of claim 1 wherein said inorganic solvent is phosphorus oxychloride.

17. The electrochemical cell of claim 1 wherein said inorganic solvent is thionyl chloride.

18. The electrochemical cell of claim 1 wherein said inorganic solvent is sulfuryl chloride.

19. The electrochemical cell of claim 1 wherein said inorganic solvent is a mixture of at least two of said inorganic solvent materials.

* * * * *